(12) United States Patent
Beck

(10) Patent No.: US 8,635,958 B2
(45) Date of Patent: Jan. 28, 2014

(54) CABLE RAILWAY SYSTEM AND METHOD OF OPERATING THE SAME

(75) Inventor: Markus Beck, Fussach (AT)

(73) Assignee: Innova Patent GmbH, Wolfurt (AT)

( * ) Notice: Subject to any disclaimer, the term of this patent is extended or adjusted under 35 U.S.C. 154(b) by 162 days.

(21) Appl. No.: 13/161,021

(22) Filed: Jun. 15, 2011

(65) Prior Publication Data

US 2012/0024187 A1 Feb. 2, 2012

(30) Foreign Application Priority Data

Jul. 29, 2010 (AT) .................................. A 1275/2010

(51) Int. Cl.
*B61B 7/06* (2006.01)
*B61B 11/00* (2006.01)

(52) U.S. Cl.
USPC ..................................... 104/117.1; 105/149.1

(58) Field of Classification Search
USPC ........ 104/89–91, 112–115, 117, 173.1, 173.2
See application file for complete search history.

(56) References Cited

U.S. PATENT DOCUMENTS 7,690,313 B2 * 4/2010 Sutter et al. ................ 104/117.1
2004/0003751 A1 1/2004 Albrich et al.

FOREIGN PATENT DOCUMENTS

EP 1 780 091 A2 5/2007

* cited by examiner

*Primary Examiner* — R. J. McCarry, Jr.
(74) *Attorney, Agent, or Firm* — Laurence A. Greenberg; Werner H. Stemer; Ralph E. Locher

(57) ABSTRACT

A cableway system has a conveying cable and chairs, which can be coupled to the conveying cable and are coupled to the conveying cable along the path of the cableway system, are uncoupled from the conveying cable at the entrance into the stations, are guided through the stations, along guide rails, by way of control tires, and are coupled to the conveying cable again at the exit from the stations, furthermore the chairs are designed with at least one safety bar and a device for adjusting the safety bar, and for locking the same, and a device for checking the locking are arranged at the exit from the stations. A first device for adjusting and locking the safety bar and an associated device for checking the locking and a second device for adjusting and locking the safety bar and an associated device for checking the locking are provided at the exit from the stations. In the case where locking has not taken place, the first checking device that is associated with the first device for adjusting and locking the safety bar, causes the second device for adjusting and locking the safety bar to be moved into its active position.

8 Claims, 9 Drawing Sheets

CABLE RAILWAY SYSTEM AND METHOD OF OPERATING THE SAME

CROSS-REFERENCE TO RELATED APPLICATION

This application claims the priority, under 35 U.S.C. §119, of Austrian patent application A 1275/2010, filed Jul. 29, 2010; the prior application is herewith incorporated by reference in its entirety.

BACKGROUND OF THE INVENTION

Field of the Invention

The present invention relates to a cableway system with a conveying cable, which is guided via a reversing pulley in each case in the two terminal stations of the cableway system, and with chairs that can be coupled to the conveying cable and that are provided with a coupling device and with a traveling-gear mechanism. They are coupled to the conveying cable along the path of the cableway system, are uncoupled from the conveying cable at the entrance into the stations, are guided through the stations, along guide rails, by way of control tires, passengers boarding the chairs or disembarking therefrom in the process, and are coupled to the conveying cable again at the exit from the stations. Furthermore, the chairs are provided with at least one safety bar and the system includes a device for adjusting the safety bar into the closed position, and for locking the same, and a device for checking the proper lock arranged at the exit from the stations. The present invention also relates to a method of operating such a cableway system.

Commonly assigned U.S. Pat. No. 7,690,313 B2 and its counterpart European patent EP 1 780 091 B1, as well as commonly assigned U.S. patent application publication No. US 2004/003751 A1 describe cableway systems which are designed with chairs and, at the exit from the stations, provided with a device by means of which the safety bar of the chairs is adjusted into its closed position and locked, wherein this device is assigned a device for checking the locking of the safety bar. As soon as the checking device determines that the safety bar of a chair has not been locked, the cableway system is stopped and the relevant safety bar is locked. However, this causes operation to be interrupted.

During operation of such cableway systems, it has been determined that, although the device for adjusting the safety bar into its closed position, and for locking the same, does not always immediately result in the safety bar being moved into the closed position and locked, whereupon the checking device assigned to this device gives an indication, or a control command, that the safety bar does indeed pass into the closed position immediately thereafter, on account of measures taken by the passengers, this safety bar still has to be locked.

SUMMARY OF THE INVENTION

It is accordingly an object of the invention to provide a cableway system and a related operating method which overcome the above-mentioned disadvantages of the heretofore-known devices and methods of this general type and which provides for technical measures by means of which resulting interruptions to operation are avoided as far as possible.

With the foregoing and other objects in view there is provided, in accordance with the invention, a cableway system, comprising:

a conveying cable extending between and guided about deflecting pulleys in two terminal stations of the cableway system;

chairs formed with a coupling device for coupling to the conveying cable and a traveling-gear mechanism, wherein the chairs are coupled to the conveying cable along a path of the cableway system, uncoupled from the conveying cable at an entrance into the stations, guided through the stations along guide rails, whereupon passengers disembark from the chairs and board the chairs, and wherein the chairs are coupled to the conveying cable at an exit from the stations;

the chairs each having at least one safety bar movably mounted between an open position and a closed position;

a first adjusting device for adjusting and locking the safety bar in the closed position and an associated first checking device for checking whether or not the safety bar is locked in the closed position;

a second adjusting device for adjusting and locking the safety bar in the closed position, the second adjusting device being disposed at a distance from the first adjusting device, in a direction of travel of the chairs, and being movable into an active position;

a second checking device, associated with the second adjusting device, for checking whether or not the safety bar is locked in the closed position at the exit from the stations;

wherein, when the first checking device determines that locking by the first adjusting device has not taken place, the first checking device causes the second adjusting device for adjusting and locking the safety bar to be moved into the active position.

In order to avoid the situation where operation of the cableway system has to be interrupted upon response of the device for checking the locking of the safety bar, this device being assigned to the device for adjusting the safety bar, according to the invention a first device for adjusting and locking the safety bar and an associated device for checking the locking of the safety bar and, at a distance from the first device for adjusting and locking the safety bar, as seen in the direction of travel of the chairs, a second device for adjusting and locking the safety bar and, likewise, an associated device for checking the locking of the safety bar are provided at the exit from the stations, wherein, in the case where locking has not taken place, that device for checking the locking of the safety bar which is assigned to the first device for adjusting and locking the safety bar causes the second device for adjusting and locking the safety bar to be moved into its active position.

If the safety bar of the relevant chair has not been moved into its closed position and locked by the first device for adjusting and locking the safety bar, there is no need here for operation of the cableway system to be interrupted immediately. Rather, the relevant chair can be moved through the second device for adjusting and locking the safety bar, whereupon the locking of the safety bar is checked again. If the safety bar has then still not been locked, operation of the cableway system is interrupted by the second checking device.

Preferably, in the case where the first device for adjusting and locking the safety bar has not locked the safety bar, that device for checking the locking of the safety bar which is assigned to the first device for adjusting and locking the safety bar in addition causes the drive speed of the relevant chair to be reduced. It is preferable for the conveying speed of the cableway system as a whole to be reduced for this purpose. However, it is also possible for the drive speed for the control tires to be reduced independently of the operation of the cableway system. Furthermore, in the case where locking of the safety bar has not taken place, that device for checking the locking of the safety bar which is assigned to the first device for adjusting and locking the safety bar causes an acoustic and/or optical signal to be emitted.

Furthermore, the second device for adjusting and locking the safety bar is preferably formed by a guide rail which is assigned to a device for adjusting and locking the safety bar and located on the chairs, and which can be pivoted out of an inactive position into an active position.

According to a preferred method of operating such a cableway system, the safety bar of the relevant chair is adjusted by the first device for adjusting and locking the safety bar, whereupon the locking of the safety bar is checked by that device for checking the locking of the safety bar which is assigned to the first device for adjusting and locking the safety bar, whereupon, in the case where the relevant safety bar has not been locked, the second device for adjusting and locking the safety bar is moved into its active position, preferably the drive speed of the relevant chair is reduced and, as a result, that device for checking the locking of the safety bar which is assigned to the second device for adjusting and locking the safety bar checks the locking of the relevant chair, wherein, in the case where the safety bar has not been locked, operation of the cableway system is stopped.

As an alternative to this, it is possible for the operation of the cableway system to be stopped, and for the safety bar of the relevant chair to be moved into the closed position, when the first checking device responds. Operation of the cableway system is resumed thereafter, wherein the safety bar of the relevant chair is locked by the second adjusting device for the safety bar.

Other features which are considered as characteristic for the invention are set forth in the appended claims.

Although the invention is illustrated and described herein as embodied in a cable railway system and method and method of operating the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
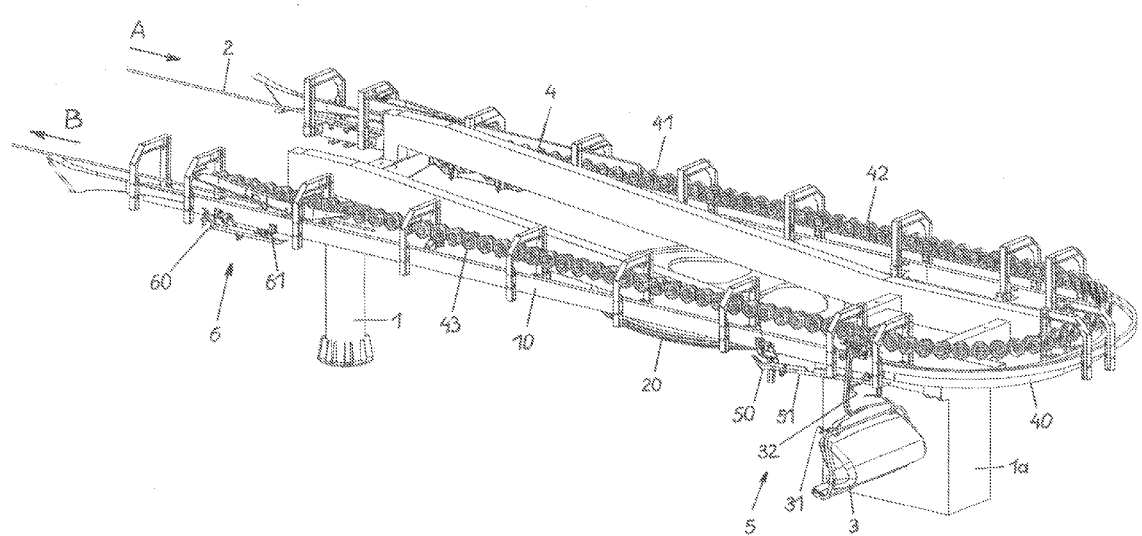
FIG. 1 is a perspective illustration of one of the terminal stations of a cableway system according to the invention, with a chair of the cableway system located in a first operating position, having two devices for adjusting and locking the safety bar of the chair.

Referring now to the figures of the drawing in detail and first, particularly, to FIG. 1 thereof, there is shown a terminal station of a cableway system with a load-bearing structure 10 which is borne by supports 1 and 1*a* and on which a cable-reversing or cable-deflecting pulley 20, also referred to as a head wheel 20, for a conveying cable 2 of the cableway system is mounted such that it can be rotated about a more or less vertical axis. The conveying cable 2 is driven via at least one of the deflecting pulleys 20 located in the cableway system. A multiplicity of chairs 3 are coupled to the conveying cable 2 along the path of the cableway system. The chairs 3 are each multi-person chairs accommodating two, or three, or four, or six, or even eight or more passengers. The movement direction of the conveying cable 2 is indicated by arrows A and B. As the chairs 3 enter into the terminal station, these chairs are uncoupled from the conveying cable 2, whereupon they are moved through this station, along a guide rail 40, by means of control tires 4. The control tires 4 are driven in that they are coupled to at least one supporting roller of the conveying cable 2, in order to be carried along therewith. A first group of control tires 4 here serve as decelerating tires 41, by means of which the speed of the chairs 3 is reduced from, for example, 6 m/sec to, for example. 0.3 m/sec. By means of a second group of control tires 4, which serve as conveying tires 42, the chairs 3 are moved at a speed of approximately 0.3 m/sec through a disembarking and boarding region for the passengers. Here, the passengers disembark from and board the chairs in the process. By means of a third group of control tires 4, these serving as accelerating tires 43, the chairs 3 are accelerated to the travel speed of the conveying cable 2, for example, 6 m/sec, whereupon they are coupled to the conveying cable 2 at the exit from the station.

In the case of such known cableway systems, the chairs 3 are configured with a safety bar 31 which, as soon as passengers have boarded the chairs 3, is adjusted into its closed position and locked, and which serves to prevent the passengers from sliding off the chairs 3. A first adjusting device 5, which is provided on the load-bearing structure 10, serves for adjusting the safety bar 31 into its closed position, and for locking the same. The adjusting device 5 has a control rail 51, which is oriented obliquely in relation to the movement direction of the chairs 3 and along which runs a cam roller or control roller 32, which is located on the chair 3. As a result, the control roller 32 is pivoted and the pivoting movement causes the safety bar 31 to be moved into its closed position and locked therein.

Such a device is described in the above-noted U.S. Pat. No. 7,690,313 B2 and European patent No. EP 1 780 091 B1, which are herewith incorporated by reference.

Furthermore, a checking device—here, a sensor 50, for instance, in the form of a pivotable rod—is provided in the movement path of the cam roller or control roller 32, and this sensor emits a control signal when the control roller 32 is located in that pivoted position in which the safety bar 31 is located in its closed position and has been locked. If, in contrast, the sensor 50 does not emit any signal, because the control roller 32 is not located in this pivoting position, and it is not ensured that the safety bar 31 is located in its closed position and has not been locked either, operation of the known cableway system is interrupted.

During the operation of such cableway systems, however, the case may arise where the safety bar 31 passes into the closed position only once it has passed the sensor 50, in which case there is no need for operation to be interrupted, provided the control roller 32 is also adjusted into that pivoting position in which the safety bar 31 has been locked.

Figure 2:
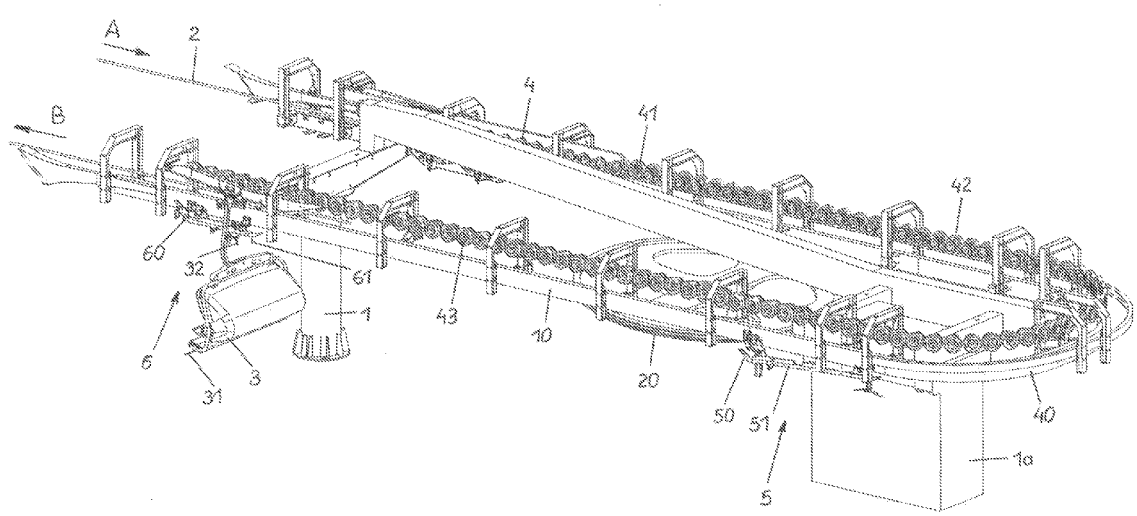
FIG. 2 is a perspective illustration of the terminal station of FIG. 1 with the chair located in a second operating position, and the second device for adjusting and locking the safety bar of the chair located in a first operating position.
Figure 3:
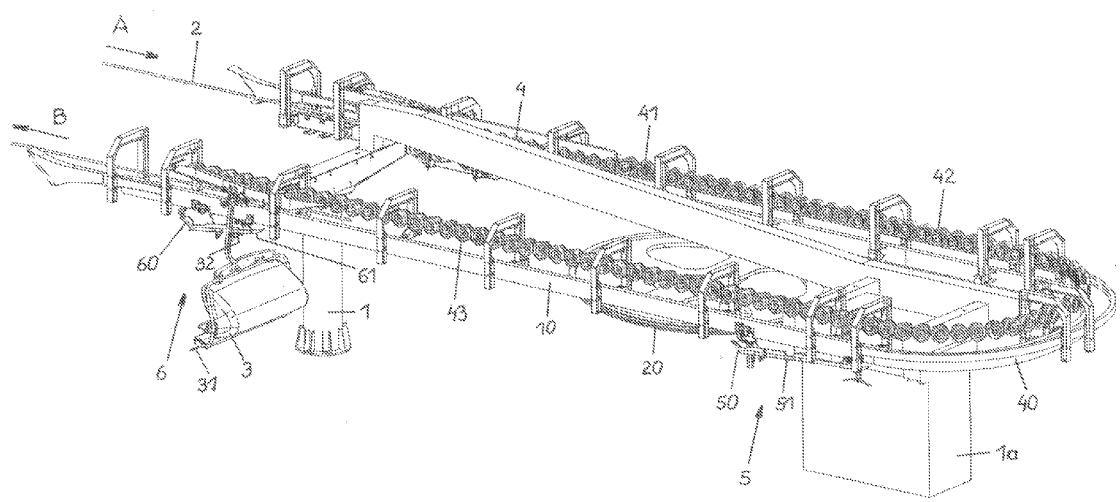
FIG. 3 is a perspective illustration of the station according to FIG. 2, the second device for adjusting and locking the safety bar of the chairs being located in a second operating position.

As can be seen from FIGS. 1, 2 and 3, in the case of a cableway system according to the invention, the cableway station contains, downstream of the first device 5 for adjusting the safety bar 31 into the closed position, and for locking the same, a second such adjusting device 6, which is likewise provided with a control rail 61 and, when active, causes the control roller 32, if not located in that pivoting position in which the safety bar 31 has been moved into its closed position and locked, to be pivoted into that position. Furthermore, this second adjusting device 6 is also assigned a sensor 60, e.g. in the form of a pivotable rod, which checks the pivoting position of the control roller 32, and thus the closed position and the locking of the safety bar 31. If the control roller 32, even after passing the second adjusting device 6, is not located in that pivoting position in which the safety bar 31 is located in its closed position and has been locked, the cableway system is brought to a standstill.

In FIGS. 1 and 2, the second adjusting device 6 for the safety bar 31 is located in its inactive position. In contrast, the second adjusting device 6 is located in its active position in FIG. 3.

Figure 1A:
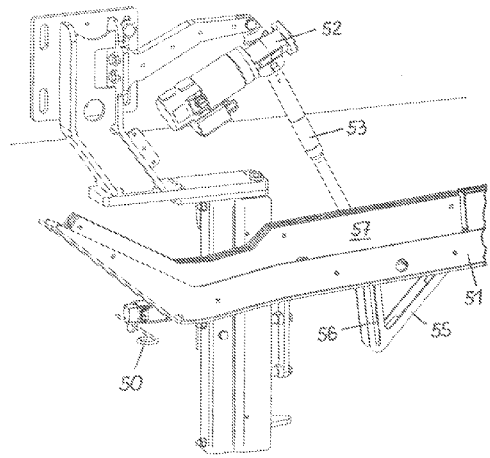
FIG. 1A shows a detail of FIG. 1, in an illustration which is on an enlarged scale in relation to FIG. 1.
Figure 1B:
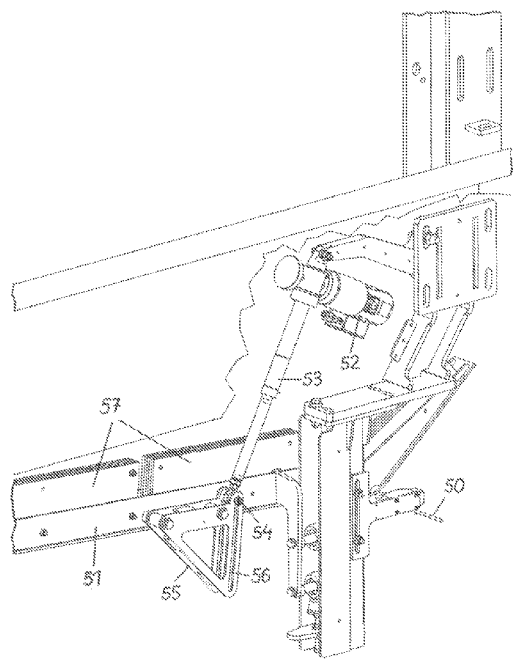
FIG. 1B shows the detail from FIG. 1A, as seen from the other side.

In FIGS. 1A and 1B, parts of the first adjusting device 5 are illustrated on an enlarged scale. As can be seen therefrom, the control rail 51 can be pivoted in a vertical plane, about a more or less horizontal axis, by means of an adjusting motor 52. For this purpose, use is made of a telescopic rod 53, which can be adjusted in its longitudinal direction by means of the drive motor 52 and which is designed with a transverse guide bolt 54 at its end which is directed away from the drive motor 52. The control rail 51 has fastened on it a triangular carrying plate 55, which is designed with a guide slot 56, through which the guide bolt 54 passes. Also located on the control rail 51 are a plurality of bars 57, which serve as weights and by means of which the control rail 51 is pivoted into its respectively lowermost position determined by the telescopic rod 53. If the safety bar 31 of the relevant chair 3 does not pass into its closed position on account of an obstruction on the chair 3, e.g. on account of a passenger's rucksack, the control rail 51 is raised, counter to the action of the weighting bars 57, by the control roller 32, this being possible by the adjustability of the guide bolt 54 in the guide slot 56. The sensor 50 is located at that end of the control rail 51 which is located in the movement direction of the chairs 3.

During conveying operation of the cableway system, the adjusting device 5 is always located in its active position. For the return travel of the chairs 3, the control rail 51 is pivoted, by means of the drive motor 52, into its upper, inactive position.

Figure 1C:
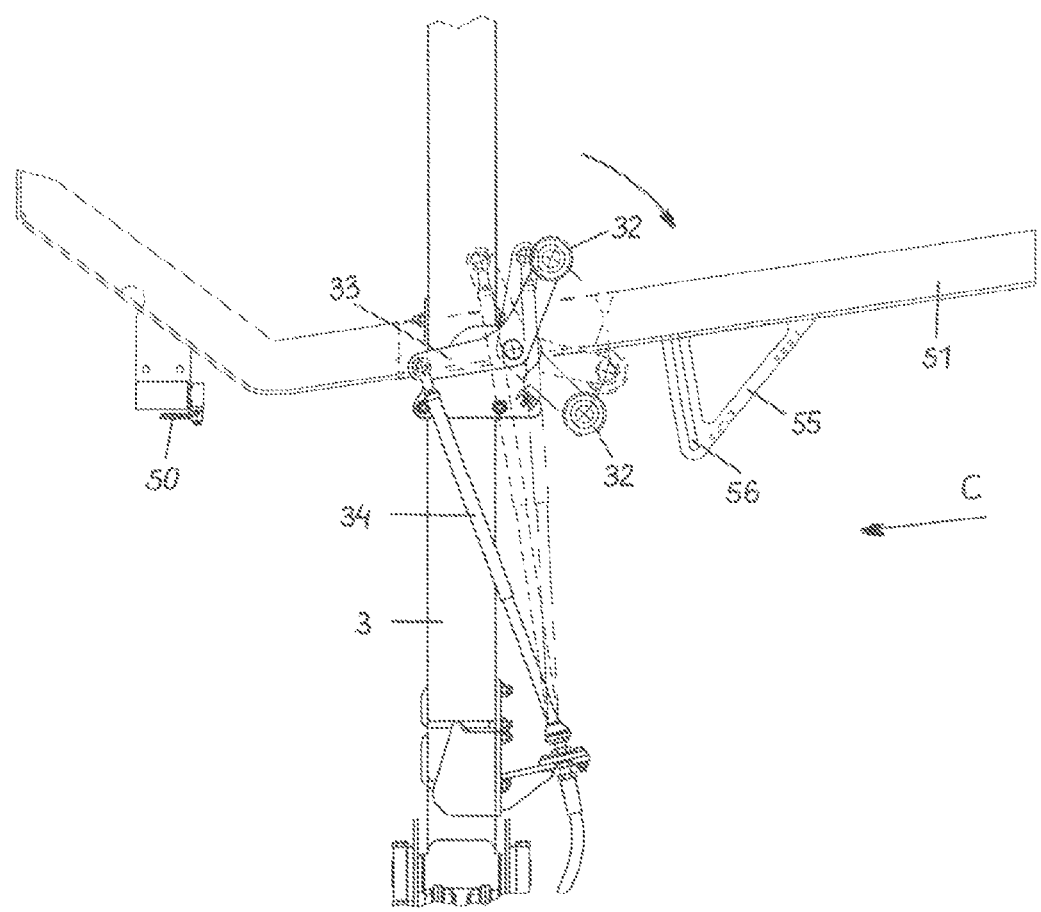
FIG. 1C shows a further detail of FIG. 1, in an illustration which is on an enlarged scale in relation to FIG. 1.

FIG. 1C shows three positions of the control roller 32, which is located on the chair 3. The control roller 32 is mounted on an angled adjusting lever 33, which can be adjusted between a first, upper pivoting position and a second, lower pivoting position. The adjusting lever 33 has articulated on it a Bowden cable 34, by means of which the safety bar 31 of the chair 3 can be adjusted and locked. As soon as the control roller 32 runs onto the locking rail 51 in the direction of the arrow C, the adjusting lever 33 with the control roller 32 is pivoted in a clockwise direction, as a result of which the safety bar 31 is pivoted into its closed position. As a result, the control lever 33 with the control roller 32 passes into an over-dead-center position, as a result of which the safety bar 31 is locked in the closed position.

However, if the safety bar 31 cannot be adjusted, on account of an obstruction on the chair 3, into that position in which the control roller 32 is located in the over-dead-center position and the safety bar 31 has been locked, the adjusting lever 33 with the control roller 32 assumes a central position, which is illustrated by dashed lines. Locking of the safety bar 31 can take place only as soon as the obstruction has been removed in order for the safety bar 31 to be adjusted.

If the control roller 32 is located in that lower pivoting position in which the safety bar 31 has been locked, movement of the control roller actuates the sensor 50, and therefore the sensor emits a control signal to the effect that operation of the cableway system is continued. In contrast, in any other pivoting positions of the control roller 32, the sensor 50 does not emit any control signal, whereupon the second control rail 61 is pivoted into its active position and preferably the drive speed of the cableway system is reduced.

As can be seen from FIGS. 2A and 2B and FIGS. 3A and 3B, the second adjusting device 6 for the safety bar 31 also has a control rail 61, which extends in the movement direction of the chairs 3 and can be pivoted vertically, about a framework-mounted pin 68, by means of a drive motor 62. It is also the case with this adjusting device 6 that the control rail 61 is coupled to the drive motor 62 via a telescopic rod 63 and a transverse guide bolt 64, which passes through, and is guided in, a guide slot 66, which is provided in a carrying plate 65 fastened on the control rail 61. Furthermore, this control rail 61 is also designed with weighting bars 67.

Figure 2A:
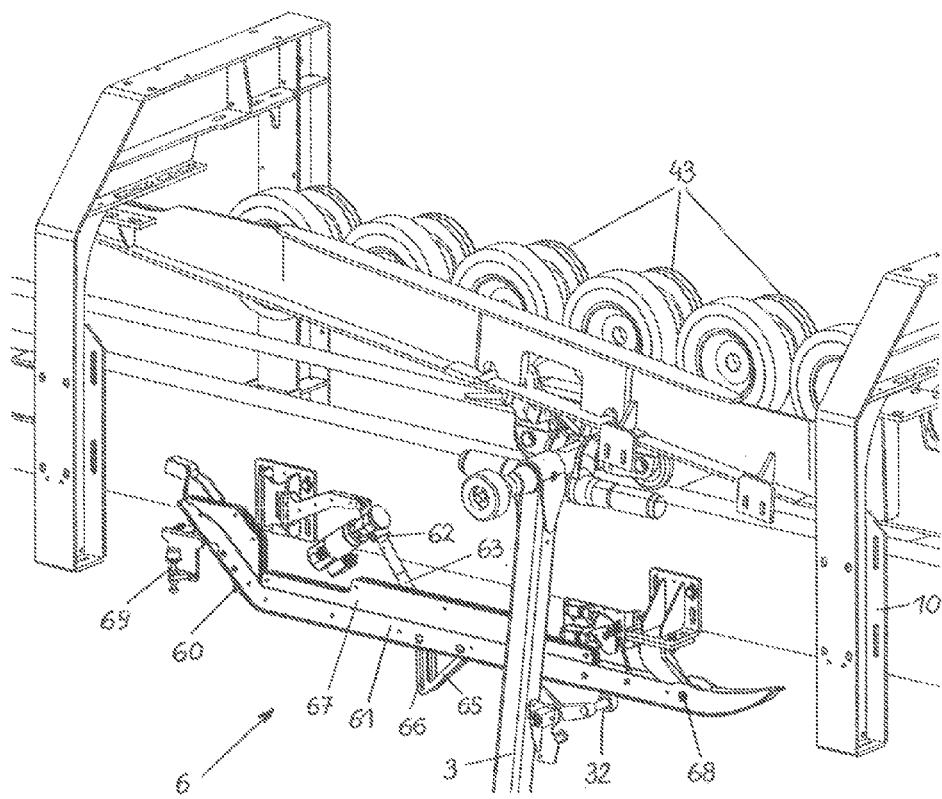
FIG. 2A shows a detail from FIG. 2, in an illustration which is on an enlarged scale in relation to FIG. 2.
Figure 2B:
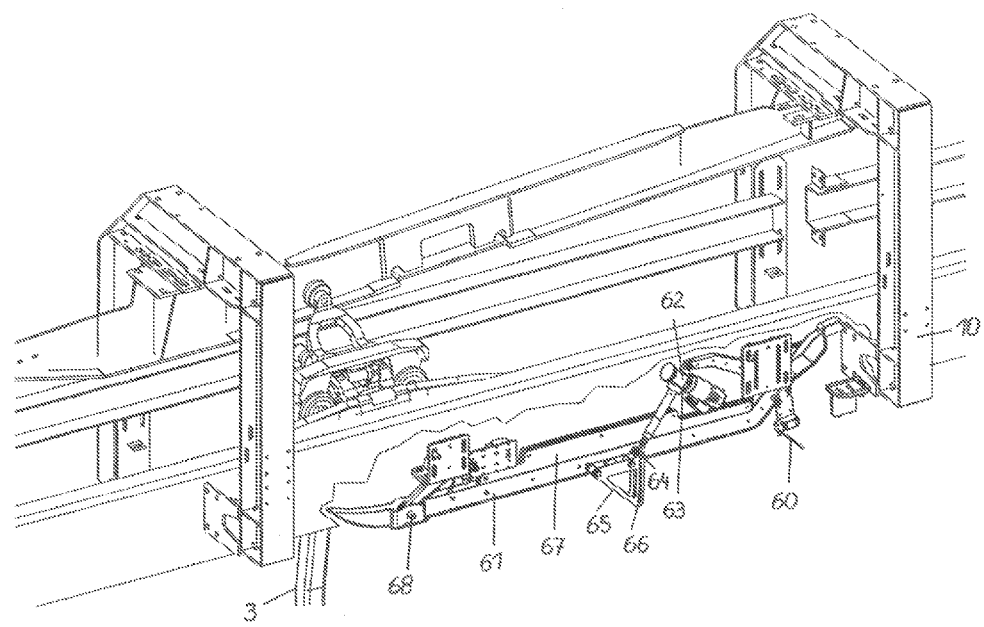
FIG. 2B shows the detail from FIG. 2A, as seen from the other side.
Figure 3A:
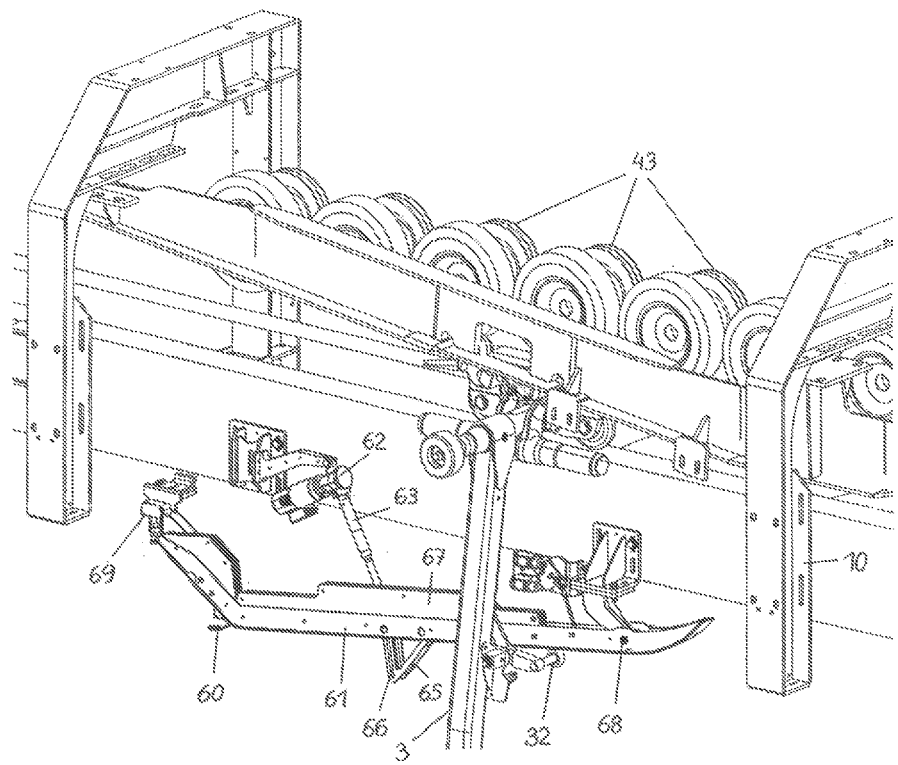
FIG. 3A shows a detail of FIG. 3, in an illustration which is on an enlarged scale in relation to FIG. 3.
Figure 3B:
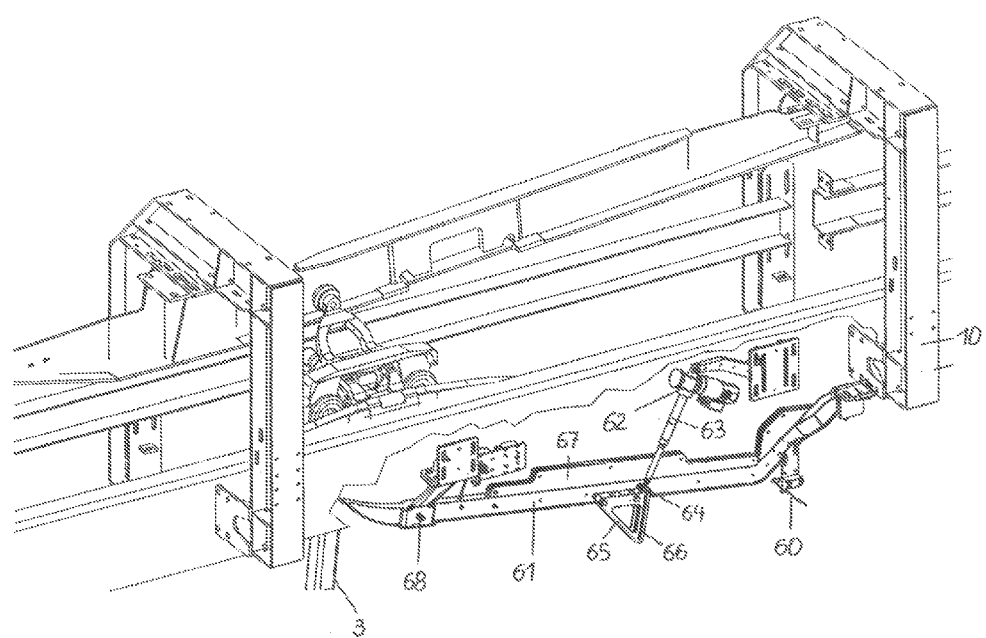
FIG. 3B shows the detail from FIG. 3A, as seen from the other side.

The control rail 61 is usually located in a first pivoting position, which is illustrated in FIGS. 2A and 2B. This is the inactive, upper position of this control rail 61, in which the control rollers 32 of the chairs 3 do not run on the control rail. If, in contrast, the control rail 61 has been moved into a second, lower pivoting position, which is illustrated in FIGS. 3, 3A and 3B, it is located in its active position, in which the control roller 32, which is located on the relevant chair 3, runs on the control rail, as a result of which it is pivoted and as a result of which the safety bar 31 of the relevant chair 3, if not already located in the closed position, is moved into this closed position and locked.

The pivoting movement of the control rail 61 is limited by an adjustable stop 69. Furthermore, the sensor 60, e.g. in the form of a control rod, is located on the control rail 61, and this sensor is actuated when the control roller 32 is located in that pivoting position in which the safety bar 31 has been locked, as a result of which a control signal is emitted to the effect that the safety bar 31 of the relevant chair 3 is located in its closed position and has been locked therein, in which case operation of the cableway system can be continued.

This cableway system operates as follows:

As soon as a chair 3 has been moved through the boarding and disembarking region by means of the conveying tires 42, it passes to the first adjusting device 5 for the safety bar 31, wherein the control roller 32 for the safety bar 31, this roller being located on the chair 3, runs onto the control rail 51 and is pivoted, as a result of which the safety bar 31 is adjusted into its closed position and is locked therein. As a result, the control roller 32 actuates the sensor 50, which emits a signal to the effect that operation of the cableway system can be continued. Thereupon, the respective chair 3 is moved on at increasing speed, by way of the accelerating tires 43, to the exit of the cableway station, whereupon it is coupled to the conveying cable 2.

The second adjusting device 6 for the safety bar 31 is located here in its inactive position.

However, if the sensor 50, which is assigned to the first adjusting device 5 for the safety bar 31, is not actuated, and therefore does not emit any operating signal, as the relevant chair 3 travels past, since the control roller 32 is not located in that pivoting position in which the safety bar 31 is located in its closed position and has been locked, on the one hand the second adjusting device 6 for the safety bar 31 is activated by the control rail 61 being moved into the second pivoting position by means of the adjusting motor 62, and on the other hand the speed of the conveying cable 2, and thus the drive speed of the accelerating tires 43, which are coupled to the conveying cable 2 in order to be carried along therewith, are reduced. By virtue of being pivoted, the control rail 61 passes into the movement path of the control roller 32, which is located on the relevant chair 3, as a result of which the control roller is pivoted, wherein this pivoting action causes the safety bar 31, if not already located in the closed position, to be moved into this position and also to be locked. The sensor 60, which is assigned to the second adjusting device 6, checks the pivoting position of the control roller 32. If the control roller 32 is located in that pivoting position in which the safety bar 31 has been locked, the second sensor 60 is actuated. This emits an operating signal, by means of which normal operation of the cableway system is resumed. If, in contrast, the sensor 60 does not emit any operating signal, since the control roller 32 is not located in the pivoting position necessary for the locking of the safety bar 31, the cableway system is brought to a standstill.

If the second adjusting device 6 is located in the region of the conveying tires 42, there is no need to reduce the drive speed of the cableway system upon response of the sensor 50, which is assigned to the first adjusting device 5. If, however, the chairs 3 are accelerated between the first adjusting device 5 and the second adjusting device 6, there is a need, upon response of the sensor 50, for the speed at which the relevant chair 3 is guided through the second adjusting device 6 to be reduced in relation to normal operating speed.

As an alternative to this, it is possible, if the sensor 50, which is assigned to the first adjusting device 5, does not emit any signal, for operation of the cableway system to be brought to a standstill and for the safety bar 31 of the relevant chair 3 to be moved into its closed position. As soon as operation of the cableway system is resumed, the control roller 32 runs onto the second locking rail 61, as a result of which the control roller 32 is pivoted into its over-dead-center position, and the safety bar 31 is thus locked.

The invention claimed is:

1. A cableway system, comprising:
    a conveying cable extending between and guided about deflecting pulleys in two terminal stations of the cableway system;
    chairs formed with a coupling device for coupling to said conveying cable and a traveling-gear mechanism, wherein said chairs are coupled to said conveying cable along a path of the cableway system, uncoupled from said conveying cable at an entrance into the stations, guided through the stations along guide rails, whereupon passengers disembark from said chairs and board said chairs, and wherein said chairs are coupled to said conveying cable at an exit from the stations;
    said chairs each having at least one safety bar movably mounted between an open position and a closed position;
    a first adjusting device for adjusting and locking the safety bar in the closed position and an associated first checking device for checking whether or not the safety bar is locked in the closed position;
    a second adjusting device for adjusting and locking the safety bar in the closed position, said second adjusting device being disposed at a distance from said first adjusting device, in a direction of travel of said chairs, and being movable into an active position;
    a second checking device, associated with said second adjusting device, for checking whether or not the safety bar is locked in the closed position at the exit from the stations;
    wherein, when said first checking device determines that locking by said first adjusting device has not taken place, said first checking device causes said second adjusting device for adjusting and locking the safety bar to be moved into the active position.

2. The cableway system according to claim 1, wherein, in the case that said first adjusting device has not locked the safety bar, said first checking device in addition causes a drive speed of the respective said chair to be reduced.

3. The cableway system according to claim 1, wherein, in the case that said first adjusting device has not locked the safety bar, said first checking device causes an acoustic and/or optical signal to be emitted.

4. The cableway system according to claim 1, wherein said second adjusting device for adjusting and locking the safety bar comprises a control rail, assigned to a control roller for the safety bar, said control roller being disposed on said chairs, and said control rail is pivotally mounted between an inactive position and the active position.

5. A method of operating a cableway system, the method which comprises:
    providing the cableway system according to claim 1;
    adjusting and locking the safety bar of a respective chair by the first adjusting device for adjusting and locking the safety bar;
    thereupon checking with the first checking device associated with the first adjusting device whether or not the safety bar is locked;
    if the first checking device determines that the respective safety bar has not been moved into the closed position and locked, moving the second adjusting device for adjusting and locking the safety bar into the active position;
    checking with the second checking device associated with the second adjusting device for adjusting and locking the safety bar, whether or not the safety bar of the respective chair is locked; and
    if the second checking device determines that the safety bar has not been locked, stopping an operation of the cableway system.

6. The method according to claim 5, which further comprises, if the first checking device determines that the respective safety bar has not been locked in the closed position reducing a drive speed of control tires moving the chairs through the station.

7. The method according to claim 5, which further comprises, if the first adjusting device has not locked the safety bar, reducing a drive speed of the respective chair.

8. The cableway system according to claim 1, wherein said second adjusting device is pivotally mounted for pivoting from an inactive position into the active position, and further comprising a drive motor connected to said second adjusting device for selectively moving said adjusting device between said active and inactive positions.

* * * * *